Nov. 15, 1927.

C. L. BASTIAN 1,649,210

SAFETY VALVE

Filed Sept. 7, 1926

Inventor:
Charles L. Bastian
By Wm. O. Belt
Atty.

Patented Nov. 15, 1927.

1,649,210

UNITED STATES PATENT OFFICE.

CHARLES L. BASTIAN, OF CHICAGO, ILLINOIS, ASSIGNOR TO THE BASTIAN-BLESSING COMPANY, OF CHICAGO, ILLINOIS, A CORPORATION OF ILLINOIS.

SAFETY VALVE.

Application filed September 7, 1926. Serial No. 133,796.

This invention relates to valves of the kind which are used on the supply tanks or cylinders containing high pressure gas, and its object is to provide such a valve with novel and improved safety means of efficient construction and operation and adapted to yield and release the gas when a predetermined pressure in the tank is exceeded.

In the accompanying drawings illustrating a selected embodiment of the invention:

Figure 1:
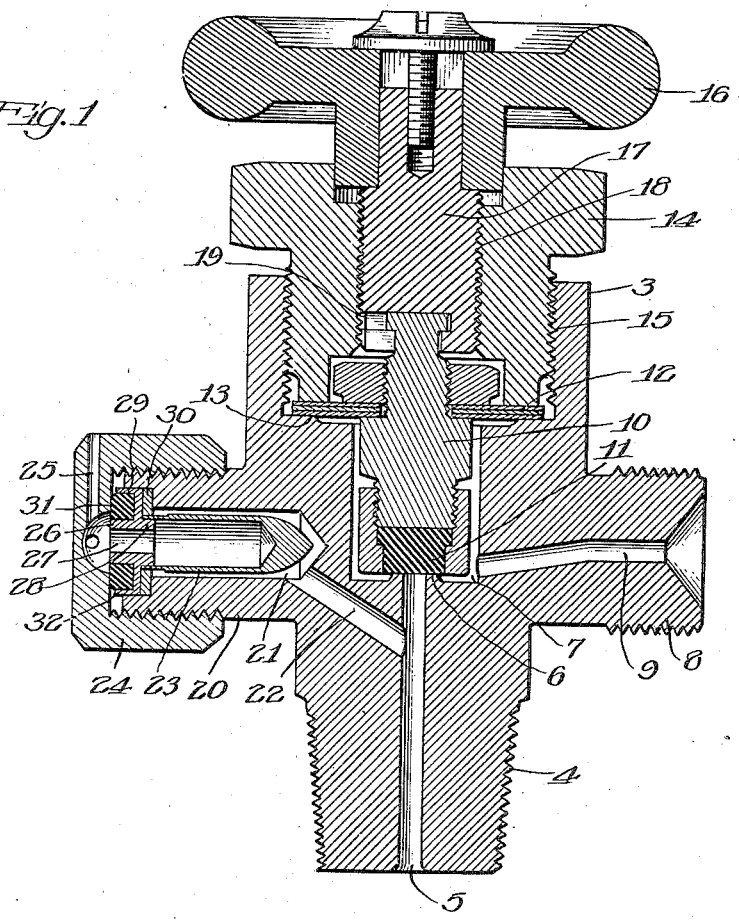
Fig. 1 is a sectional view of the valve.
Figure 2:
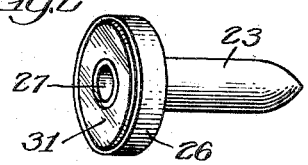
Fig. 2 is a perspective view of the safety device.

I have shown the invention embodied in a valve like that covered by my application Serial No. 133,795 filed concurrently herewith and comprising a body 3 having a threaded end 4 adapted to be screwed into the tank and provided with a gas passage 5 extending through the seat 6 and communicating with the valve chamber 7. A threaded nipple 8 is adapted to be connected with means for charging or discharging the tank and this nipple is provided with a passage 9 which communicates with the valve chamber 7. A valve member 10 is arranged in the valve chamber 7 and it carries a valve disk 11 which engages the seat 6. A diaphragm 12 is clamped gas tight on the valve member and its margin is clamped gas tight against a shoulder 13 on the body by a plug 14 which is screw threaded in a recess 15 in the body. A hand wheel 16 has a stem 17 which is screw threaded in the opening 18 in the plug and this stem has a head and slot connection 19 with the valve member whereby the hand wheel and stem may have conjoint movement with the valve member longitudinally but independent movement rotatively. In this particular valve the disk is moved to and from the seat by direct action of the hand wheel and the sole function of the diaphragm is to provide a gas tight closure for the upper ends of the valve chamber.

I have chosen this valve because of its efficiency and simplicity, to illustrate the present invention of the safety means, but I do not thereby limit or restrict this invention to use with a valve of the particular construction shown and described for it will be readily understood that the safety means may be embodied with equally satisfactory results in valves constructed differently from the one shown.

The safety device comprises a nipple 20 on the valve body and it is provided with a safety chamber 21 communicating by a passage 22 with the gas passage 5. A cylinder 23 open at one end and closed at the other is arranged within the chamber 21 and is held in place by a cap 24 screw threaded on the nipple 20 and having one or more air passages 25 through which atmospheric pressure is constantly admitted to the interior of the cylinder. I prefer to provide a head 26 for the cylinder having a passage 27 therein and a boss 28 on which the open end of the cylinder is mounted. A washer 30 is arranged between the head and the nipple 20 and a washer 31 is seated in the head to be engaged on the cap whereby the cylinder may be clamped tightly against the nipple to support the cylinder in the chamber 21 free from contact with the wall thereof.

The exterior of the cylinder is exposed to the pressure in the tank while the interior of the cylinder is exposed to atmospheric pressure. Whenever the tank pressure exceeds the resistance of the cylinder the latter will collapse and shear on the edge of the boss 28 to permit the gas to escape from the tank. I prefer to thin the wall of the cylinder at the edge of the boss by reducing the exterior diameter or increasing the interior diameter of the cylinder, but this thinning may be done in other ways.

Heretofore disks have been employed as a safety means, but their efficiency depends upon the texture and hardness of the metal and they deteriorate under continued pressure. For this and other reasons it is not practicable to provide a disk which will not fracture somewhere in a range of 300 or 400 pounds. The cylinder is a great improvement upon the disk because the cylinder is not affected like the disk by continued pressure since there is no tendency of the metal of the cylinder to stretch, as there is in the disk; and the cylinder can be formed to fracture within a much smaller range of pressure than a disk. Practical tests have shown that with the cylinder the range of fracture can be easily held within 100 pounds. The cylinder thus provides an efficient safety device which is superior to those now being used and therefore it makes these high pressure gas tanks safe to handle under all temperature conditions.

Changes may be made in the form, construction and arrangement of the invention of the safety means to adapt it for valves of different kinds, and for other purposes, and I reserve the right to make all such changes as fairly fall within the scope of the following claims.

I claim:

1. A gas valve comprising a body having a chamber therein in communication with the gas supply, and a cylindrical member supported within the chamber and exposed exteriorly to the gas pressure and interiorly to atmospheric pressure, the wall of said member being adapted to fracture under excessive gas pressure to permit escape of the gas.

2. A gas valve comprising a body having a chamber therein in communication with the gas supply, a cylinder open at one end and closed at the other end, and means supporting the cylinder in the chamber and comprising a boss entered into the open end of the cylinder, said cylinder being exposed exteriorly to the gas pressure and interiorly to atmospheric pressure, the wall of the cylinder being adapted to collapse and shear on the edge of the boss under excessive gas pressure to permit escape of the gas.

3. A gas valve comprising a body having a chamber therein in communication with the gas supply, a cylinder open at one end and closed at the other end, and means supporting the cylinder in the chamber and comprising a head, a boss in the head entered into the open end of the cylinder, and a cap engaged with the body and clamping the head against the body, said cap and head and boss having passages therein admitting atmospheric air to the cylinder, the wall of the cylinder being adapted to collapse and shear on the edge of the boss under excessive gas pressure to permit escape of the gas.

4. A gas valve comprising a body having a chamber therein in communication with the gas supply, and a cylindrical member supported within the chamber and exposed exteriorly to the gas pressure and interiorly to atmospheric pressure, the said wall having a thinned section adapted to fracture under excessive gas pressure to permit escape of the gas.

5. A gas valve comprising a body having a chamber therein in communication with the gas supply, a cylinder open at one end and closed at the other end, and means supporting the cylinder in the chamber and comprising a boss entered into the open end of the cylinder, said cylinder being exposed exteriorly to the gas pressure and interiorly to atmospheric pressure, the wall of the cylinder being thinned at the end of the boss and adapted to collapse and shear on the edge of the boss under excessive gas pressure to permit the escape of the gas.

CHARLES L. BASTIAN.